United States Patent
Nakanishi et al.

(10) Patent No.: US 10,422,946 B2
(45) Date of Patent: Sep. 24, 2019

(54) COUPLED MULTI-CORE OPTICAL FIBER

(71) Applicant: SUMITOMO ELECTRIC INDUSTRIES, LTD., Osaka-shi, Osaka (JP)

(72) Inventors: Tetsuya Nakanishi, Yokohama (JP); Tetsuya Hayashi, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/014,907

(22) Filed: Jun. 21, 2018

(65) Prior Publication Data

US 2018/0299613 A1  Oct. 18, 2018

Related U.S. Application Data

(63) Continuation of application No. 15/451,922, filed on Mar. 7, 2017, now Pat. No. 10,031,283.

(30) Foreign Application Priority Data

Mar. 9, 2016 (JP) ................................ 2016-045641

(51) Int. Cl.
    *G02B 6/02* (2006.01)
(52) U.S. Cl.
    CPC ..... *G02B 6/02042* (2013.01); *G02B 6/02014* (2013.01)
(58) Field of Classification Search
    None
    See application file for complete search history.

(56) References Cited

U.S. PATENT DOCUMENTS

| | | | |
|---|---|---|---|
| 2013/0243381 A1 | 9/2013 | Hayashi | |
| 2013/0294737 A1* | 11/2013 | Dianov | G02B 6/02042 385/127 |

(Continued)

FOREIGN PATENT DOCUMENTS

| | | |
|---|---|---|
| JP | S60-176004 A | 9/1985 |
| JP | 2011-209702 A | 10/2011 |
| JP | 5545236 B2 | 7/2014 |

OTHER PUBLICATIONS

Tetsuya Hayashi, et al., "Physical interpretation of intercore crosstalk in multicore fiber: effects of macrobend, structure fluctuation, and macrobend", Optics Express vol. 21, No. 5, Mar. 11, 2013, p. 5401-p. 5412.

(Continued)

*Primary Examiner* — Sung H Pak
(74) *Attorney, Agent, or Firm* — Drinker Biddle & Reath LLP

(57) ABSTRACT

The present embodiment relates to a CMCF including a structure to achieve more efficient reduction in transmission loss by suppressing decrease in concentration of alkali metal due to diffusion of alkali metal. In the CMCF including a plurality of cores, a power coupling coefficient h between adjacent cores is set to $1 \times 10^{-3}$/m or more, to maintain an optical coupling state between the adjacent cores. In addition, alkali metal contributing to reduction in transmission loss is added to each of the cores such that a stress maximum value $\sigma_{\_max}$ between adjacent cores has a negative value.

16 Claims, 7 Drawing Sheets

(56) References Cited

U.S. PATENT DOCUMENTS

2015/0316715 A1 11/2015 Matsuo et al.
2017/0102501 A1 4/2017 Hayashi

OTHER PUBLICATIONS

Tetsuya Hayashi et al., "Coupled-Core Multi-Core Fibers: High-Spatial-Density Optical Transmission Fibers with Low Differential Modal Properties", ECOC2015, We.1.4.1, 2015.
Beril Inan, et al., "DSP complexity of mode-division multiplexedreceivers", Optics Express vol. 20, No. 9, Apr. 23, 2012, p. 10859-p. 10869.
R. Ryf, et al., "1705-km Transmission over Coupled-Core Fibre Supporting 6 Spatial Modes", ECOC2014, PD.3.2, Cannes-France, 2014.
Office Action dated Sep. 21, 2017 from parent U.S. Appl. No. 15/451,922.
Notice of Allowance dated Mar. 28, 2018 from parent U.S. Appl. No. 15/451,922.

\* cited by examiner

Fig.5

| | Λ_core (μm) | h (/m) | A_eff (μm²) | σ_max (MPa) | TRANSMISSION LOSS (dB/km) | AMOUNT OF DECREASE IN TRANSMISSION LOSS (dB/km) |
|---|---|---|---|---|---|---|
| COMPARATIVE EXAMPLE (SCF) | — | — | 110 | — | 0.161 | — |
| SAMPLE 1 (CMCF1) | 28 | $1.1 \times 10^{-2}$ | 107 | -28 | 0.148 | -0.013 |
| SAMPLE 2 (CMCF2) | 32 | $1.0 \times 10^{-3}$ | 109 | -20 | 0.153 | -0.008 |
| SAMPLE 3 (CMCF3) | 38 | $8.5 \times 10^{-6}$ | 105 | 1 | 0.158 | -0.003 |

COUPLED MULTI-CORE OPTICAL FIBER

This is a continuation application of copending prior application Ser. No. 15/451,922, filed on Mar. 7, 2017, which is incorporated by reference herein in its entirety.

BACKGROUND

Technical Field

The present invention relates to a coupled multi-core optical fiber (hereinafter simply referred to as "CMCF") enabling mode division multiplex transmission while maintaining an optical coupled condition between cores adjacent to each other.

Related Background Art

Japanese Patent Application Laid-Open No. 2011-209702 (Patent Document 1) discloses a technique of reducing transmission loss relating to a multi-core optical fiber (hereinafter simply referred to as "MCF") in which a plurality of cores are comprised of pure silica glass. Japanese Patent No. 5545236 (Patent Document 2) discloses a technique of reducing transmission loss by adding alkali metal to the core. In addition, Japanese Patent Application Laid-Open No. S60-176004 (Patent Document 3) discloses a structure in which a plurality of single-core fibers can be separated by adopting glass to which alkali metal that is easily melted by acid or the like is added, as glass covering the outermost circumferential surface of the single-core fibers forming a bunch fiber. Tetsuya Hayashi, et al., "Physical interpretation of intercore crosstalk in multicore fiber: effects of macrobend, structure fluctuation, and microbend", OPTICS EXPRESS Vol. 21, No. 5, pp. 5401-5412 (Mar. 11, 2013) (Non-Patent Document 1) has description relating to transmission loss of an MCF, and Tetsuya Hayashi et al., "Coupled-Core Multi-Core Fiber: High-Spatial-Density Optical Transmission Fibers with Low Differential Modal Properties", ECOC2015, We. 1. 4. 1. (2015) (Non-Patent Document 2) has description relating to transmission loss of an MCF manufactured by a rod-in collapse method.

Non-Patent Document 1 described above describes the definition of the power coupling coefficient of adjacent cores. Non-Patent Document 2 described above describes a coupled MCR In addition, R. Ryf, et al., "1705-km Transmission over Coupled Core Fibre Supporting 6 Spatial Modes", ECOC2014, PD. 3. 2., Cannes-France (2014) (Non-Patent Document 3) discloses a test result of mode division multiplex transmission to which a coupled MCF is applied, and Beril Inan, et al., "DSP complexity of mode-division multiplexed receivers", OPTICS EXPRESS Vol. 20, No. 9, pp. 10859-10869, (Apr. 23, 2012) (Non-Patent Document 4) discloses a multi-input-multi-output (hereinafter referred to as MIMO (Multi-Input-Multi-Output)) technique to enable mode multiplexing and mode division.

SUMMARY

The inventors have investigated conventional MCFs, and consequently have found the following problem.

Specifically, it is well known that adding alkali metal elements to the core is effective for reduction in loss. However, alkali metal elements are easily diffused in comparison with other elements, and the alkali metal concentration in the core in the optical fiber reduces in comparison with the concentration in a preform, during drawing from the preform to the optical fiber. Accordingly, the alkali metal concentration capable of contributing to structural relaxation of the core glass in drawing is limited to some extent. In particular, in the conventional art described above in which alkali metal is added to only one core, alkali metal of high concentration cannot be added, to prevent crystallization of the glass region corresponding to the core. In an MCF in which a plurality of cores can be closely arranged, addition of alkali metal is advantageous for reduction in loss, because alkali metal can be easily diffused. However, in a non-coupled MCF, when a distance (hereinafter referred to as "core pitch") between centers of adjacent cores is too small, crosstalk (hereinafter referred to as "XT") occurs between cores, and thus reduction in transmission loss is also limited.

The present invention has been made to solve the problem as described above. An object of the present invention is to provide a coupled MCF (CMCF) including a structure for achieving more efficient reduction in transmission loss by suppressing decrease in concentration caused by diffusion of alkali metal. In a CMCF, the core pitch is intentionally reduced, to generate XT (inter-core XT) between signals transmitted through the respective cores. The signals between which XT occurs are decoded by MIMO processing disclosed in Non-patent Document 4 described above (see Non-patent Documents 2 and 3 described above). For this reason, mode division multiplex transmission is enabled with a transmission system in which the CMCF is combined with MIMO processing. Because a CMCF actively generating inter-core XT as described above can be designed with a narrower core pitch than that of a non-coupled MCF, alkali metal can easily be diffused mutually between adjacent cores, and the CMCF is expected to suppress reduction in concentration caused by diffusion of alkali metal (achievement of low transmission loss). Based on the consideration described above, the inventors have found a core pitch and stress profiles thereof effective for reducing transmission loss in the CMCF.

A CMCF according to the present embodiment comprises a plurality of cores each extending along a predetermined direction, and a single cladding covering the respective cores. In particular, each of the cores includes alkali metal of a predetermined concentration contributing to reduction in transmission loss. In addition, to maintain an optical coupling state between adjacent cores among the cores, a power coupling coefficient h between the adjacent cores is set to $1 \times 10^{-3}$/m or more. In addition, to achieve marked reduction in transmission loss, a maximum value $\sigma\_{max}$ of stress profile on a line segment connecting centers of the adjacent cores has a negative value (compressive stress).

BRIEF DESCRIPTION OF THE DRAWINGS

FIG. 5 is a table illustrating optical properties of three samples to 3 (CMCF1 to CMCF3) of the CMCF according to the first embodiment, and a single-core fiber (hereinafter referred to as SCF (single-core optical fiber)) serving as a comparative example thereof.

DETAILED DESCRIPTION

Explanation of Embodiments of Present Invention

Figure 1A:
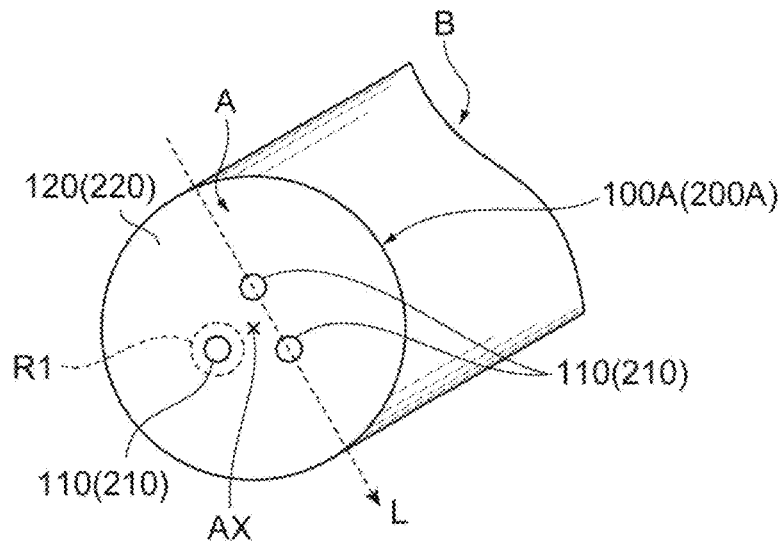
FIGS. 1A to 1C are diagrams illustrating cross-sectional structures, refractive index profiles, and alkali metal concentration profiles of a CMCF and a preform according to a first embodiment, respectively.

First, details of embodiments of the present invention will be individually explained hereinafter.

(1) A CMCF (coupled multicore optical fiber) according to the present embodiment comprises a plurality of cores each extending along a predetermined direction, and a single cladding covering the respective cores, as an aspect thereof In particular, each of the cores includes alkali metal of a predetermined concentration contributing to reduction in transmission loss. In addition, to maintain an optical coupling state between adjacent cores among the cores, a power coupling coefficient h between the adjacent cores is set to $1\times10^{-3}$/m or more. In addition, to achieve marked reduction in transmission loss, a maximum value $\sigma\_max$ of a stress profile on a line segment connecting centers of the adjacent cores has a negative value. Specifically, compressive stress remains in the cladding positioned between adjacent cores. The maximum value $\sigma\_max$ being positive means that tensile stress remains in the cladding positioned between adjacent cores. Each of the cores includes one or at least two of alkali metals selected from the group consisting of lithium, sodium, potassium, and rubidium.

The optical fiber according to the aspect described above is a CMCF, and a transmission medium applied to a transmission system decoding each of signals by MIMO processing, even when XT (inter-core XT) occurs between the signals transmitted through the respective cores. Such a CMCF is required to maintain differential group delay (DGD) between signals to be small, to reduce the load of MIMO processing. For this reason, in a CMCF, the core pitch is narrowed to actively generate XT between signals. A CMCF is designed to mix signals by actively generating XT between signals, to substantially reduce DGD between signals (see Non-patent Document 3). The core pitch depends on the refractive index structure of each of the cores. To sufficiently generate XT between signals, the power coupling coefficient h between adjacent cores is preferably set to $1\times10^{-3}$/m (see Non-patent Document 2).

To efficiency reduce transmission loss, a plurality of alkali metal added regions are provided in the preform of the CMCF before drawing, and alkali metal is required to be diffused between the alkali metal added regions during drawing of the preform. In this state, viscosity of glass around the cores reduces due to diffusion of alkali metal, and a region in which compressive stress remains is provided in the CMCF after drawing. For example, in the preform of the CMCF, with the structure in which each of a plurality of core portions includes an alkali metal added region, a cladding disposed between adjacent cores serves as an alkali metal diffusion region in the CMCF after drawing. Forming a plurality of alkali metal added regions in the preform of the CMCF before drawing as described above prevents decrease in alkali metal concentration during drawing, and produces a CMCF with an efficiently reduced transmission loss.

As an aspect of the present embodiment, the maximum value $\sigma\_max$ of the stress profile is preferably −20 MPa or less.

(3) As an aspect of the present embodiment, the core pitch $\Lambda_{core}$ is preferably 35 μm or less.

(4) As an aspect of the present embodiment, in the preform of the CMCF before drawing, a region corresponding to the cladding may be provided with at least one alkali metal added region. In this case, in the CMCF after drawing, a distance $\Lambda_{core\text{-}clad}$ between the diffusion center position corresponding to the central position of the alkali metal added region in the preform and the central position of the core adjacent to the diffusion center position among the cores is preferably 45 μm or less. More preferably, the distance is 30 μm or less, and further preferably, the distance is 25 μm or less.

(5) As an aspect of the present embodiment, each of the cores is comprised of $SiO_2$ glass in which a concentration of $GeO_2$ molecules is set to be 0 wt % or more to 1 wt % or less. Namely, each of the cores does not include $GeO_2$ molecules or includes $GeO_2$ molecules having a concentration of 1 wt % or less. In the structure in which fluorine is added to the cladding, transmission loss of each of the cores is preferably 0.16 dB/km or less at a wavelength of 1550 nm. More preferably, the transmission loss at the wavelength of 1550 nm is 0.155 dB/km or less, and further preferably 0.150 dB/km or less.

(6) As an aspect of the present embodiment, in the structure in which germanium of predetermined concentration is added to at least one of the cores, the transmission of the core doped with the germanium is preferably 0.18 dB/km or less at the wavelength of 1550 nm.

(7) As an aspect of the present embodiment, average concentration of alkali metal in each of the cores is preferably 0.2 atom ppm or more and 50 atom ppm or less.

(8) As an aspect of the present embodiment, in the preform of the CMCF before drawing, average concentration of halogen elements in each of regions corresponding to the cores is preferably 1000 atom ppm or more and 30000 atom ppm or less.

(9) As an aspect of the present embodiment, concentration of alkali metal in the surface of the cladding is preferably 1 atom ppm or less.

Each of the aspects mentioned in the column of "Explanation of Embodiments of Present Invention" is applicable to each of the other aspects, or all the combinations of the other aspects.

Details of Embodiments of Present Invention

Specific examples of a CMCF according to the present invention will be described in detail hereinafter with reference to attached drawings. The present invention is not limited to these examples, but is intended to include all changes within the meanings and ranges equivalent to the claims. In the explanation of the drawings, the same elements are denoted by the same reference numerals, and overlapping explanation is omitted.

First Embodiment

FIG. 1A illustrates a cross-sectional structure of a preform 100A before drawing for manufacturing a CMCF 200A according to a first embodiment. The cross section illustrated in FIG. 1A is a cross section orthogonal to a central axis AX (agreeing with the longitudinal direction of the preform 100A) of the preform 100A. The preform 100A includes core portions 110 each extending along the central axis AX from one end A to the other end B, and a cladding portion 120 covering each of the core portions 110. In the cross section of FIG. 1A, three core portions 110 are arranged to surround the central axis AX, as an example. The CMCF 200A with the cross section illustrated in FIG. 1A is obtained by drawing the preform 100A, and its cross-sectional structure is similar to the cross-sectional structure of the preform 100A. Specifically, cores 210 of the CMCF 200A obtained by drawing the preform 100A correspond to the core portions 110 of the preform 100A, and a cladding 220 of the CMCF 200A corresponds to the cladding portion 120 of the preform 100A. As an example of arrangement of cores, FIG. 1A illustrates a structure in which three core portions 110 (or cores 210) are arranged around the central axis AX of the preform 100A (or the CMCF 200A), but various core arrangements may be applied to the present embodiment as described later, and the core arrangement is not limited to the example of FIG. 1A.

Figure 1B:
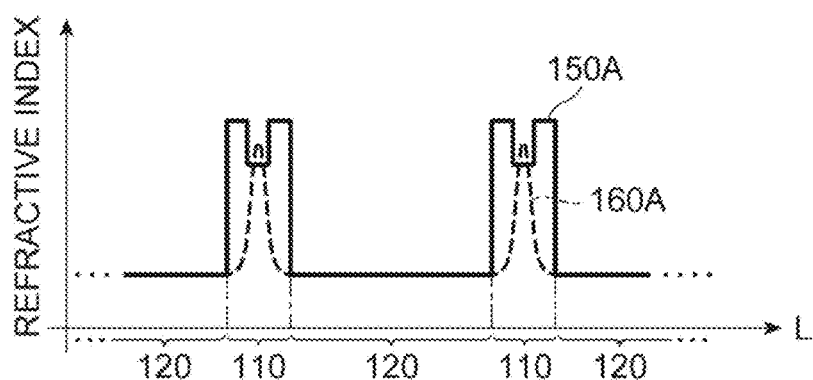

FIG. 1B illustrates a refractive index profile 150A and an alkali metal concentration profile 160A of the preform 100A along a line L (line running through the centers of the adjacent core portions 110) in FIG. 1A. As can be seen from FIG. 1B, in the present embodiment, each of the core portions 110 of the preform 100A serves as an alkali metal added region to which alkali metal is added.

Figure 1C:
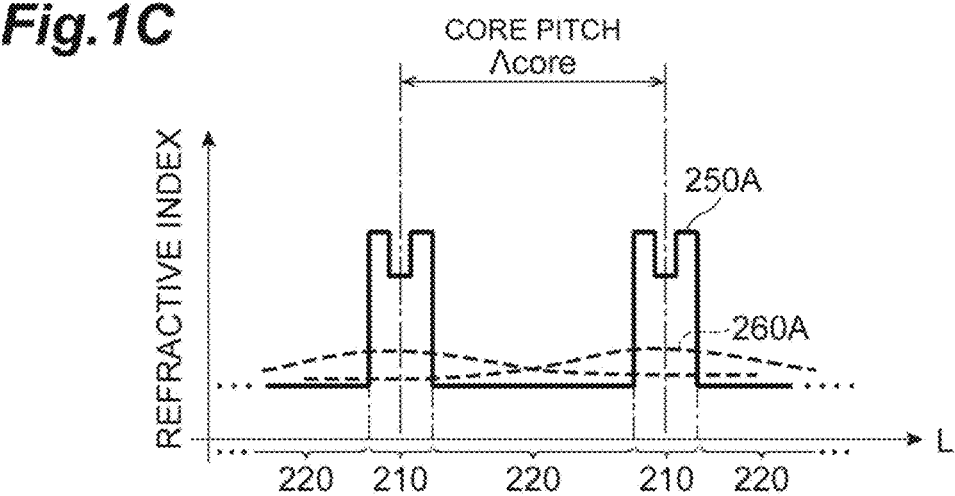

FIG. 1C illustrates a refractive index profile 250A and an alkali metal concentration profile 260A of a CMCF 200A obtained by drawing the preform 100A according to the present embodiment. The profiles are profiles along line L in FIG. 1A, like FIG. 1B.

Figure 2A:
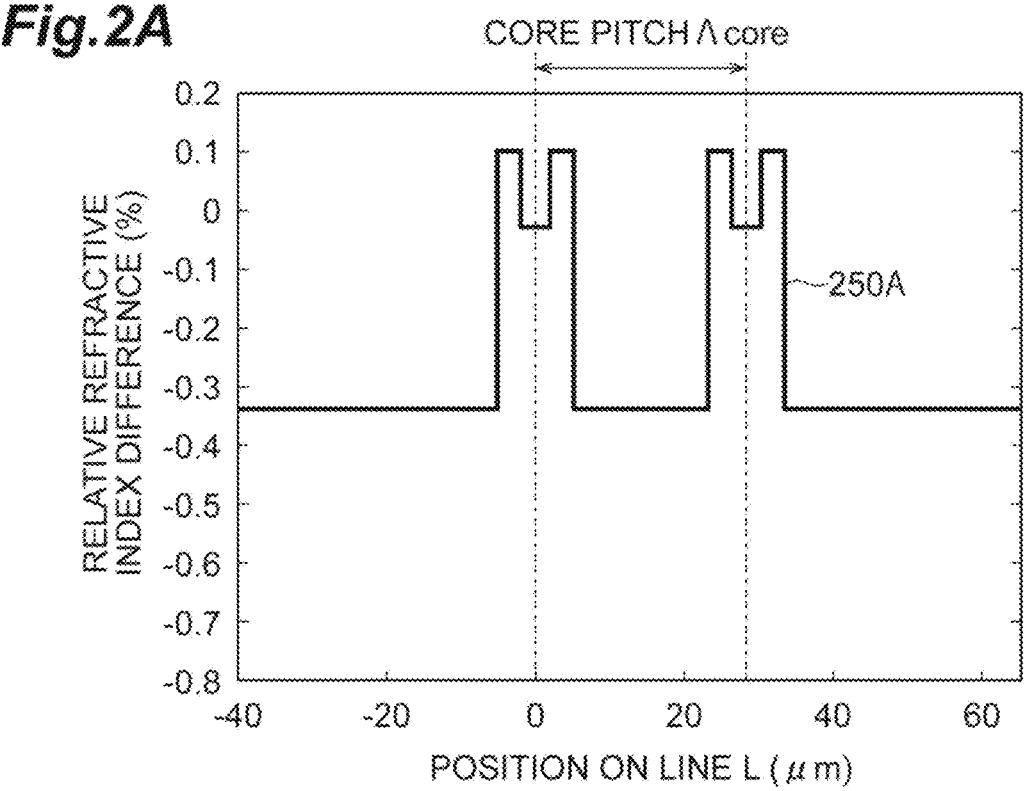
FIGS. 2A and 2B are diagrams for explaining relation between the refractive index profile and the stress profile of the CMCF according to the first embodiment.
Figure 2B:
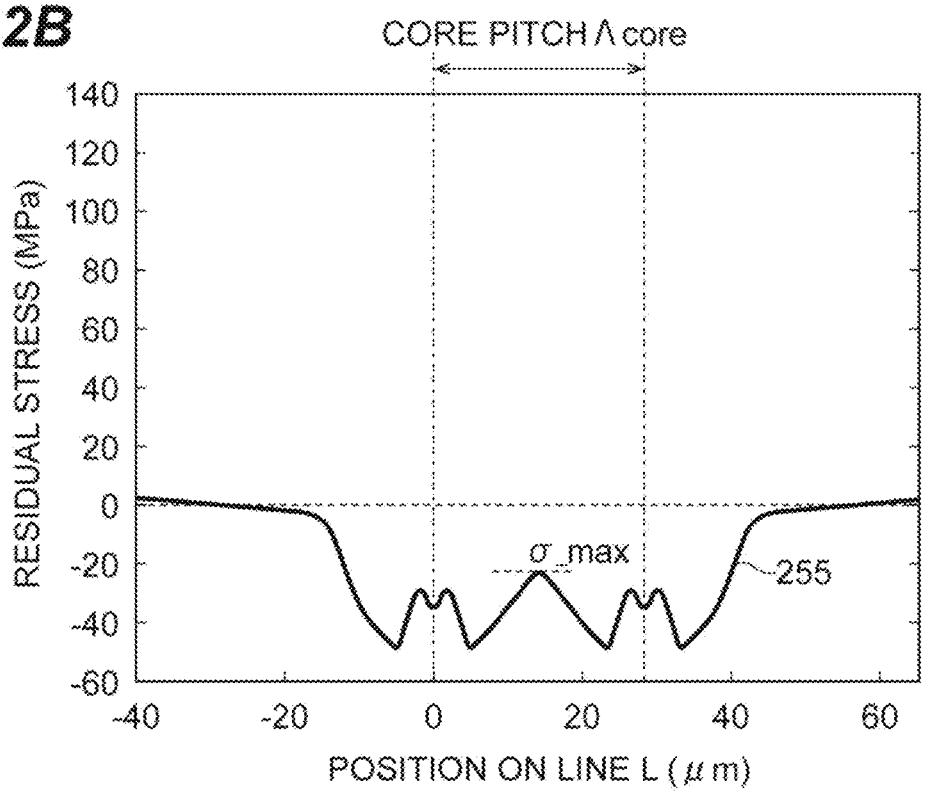

In addition, FIGS. 2A and 2B are diagrams for explaining relation between the refractive index profile 250A of the CMCF 200A illustrated in FIG. 1C and a stress profile 255. In particular, FIG. 2A illustrates the refractive index profile 250A of the CMCF 200A illustrated in FIG. 1C, and FIG. 2B illustrates the stress profile 255 associated with the refractive index profile 250A at positions on the line L in FIG. 1A. When each of the cores 210 of the preform 100A serve as alkali metal added region as illustrated in FIG. 1B, alkali metal are diffused from each of the cores 210 in the CMCF 200A obtained after drawing, and alkali metal exists also between the adjacent cores 210. In this state, the viscosity of glass around each core 210 decreases, and the stress profile 255 with the shape as illustrated in FIG. 2B is obtained. In the specification of the present application, $\sigma\_max$ indicates the maximum value of the stress profile on the line segment connecting the centers of the adjacent core portions 110 in the CMCF 200A. Specifically, because the maximum value $\sigma\_max$ of the stress profile 255 illustrated in FIG. 2B has a negative value, a compressive stress remaining region is provided in the core 210 and the cladding 220 disposed around the core 210.

Generally, in the preform 100A provided with core portions 110 to each of which alkali metal is added, alkali metals in each of the core portions 110 are mutually diffused, because the preform 100A is heated during drawing. This structure decreases the alkali metal concentration in each of the cores 210 in the CMCF 200A after drawing, as illustrated in FIG. 1C. However, when the core pitch $\Lambda_{core}$ reduces, alkali metal diffused from a core flows into the adjacent core, to ease decrease in concentration of alkali metal, and promote relaxation of the glass structure. With this structure, the CMCF 200A according to the present embodiment enables reduction in transmission loss. In addition, the CMCF 200A is expected to reduce transmission loss in comparison with the case of an SCF (see Non-patent Document 2). To efficiently diffuse alkali metal mutually between the cores 210, the adjacent cores are preferably close to each other (the core pitch $\Lambda_{core}$ is small). By contrast, in a non-coupled MCF, inter-core XT increases. When the inter-core XT is large, increase in transmission loss also occurs due to the inter-core XT in a non-coupled MCF, and the effect of addition of alkali metal is limited.

By contrast, the CMCF 200A according to the present embodiment is designed to substantially reduce DGD between signals to reduce the load of the MIMO processing. To sufficiently generate XT between signals, the power coupling coefficient h between adjacent cores is designed to be $1 \times 10^{-3}$/m or more.

As disclosed in Non-patent Document 1 described above, for example, the optical power Pn moving from a core in to a core n per unit length can be expressed with following Expression (1).

$$dP_n/dz = h(P_m - P_n) \quad (1)$$

where h is the power coupling coefficient, and means efficiency with which the optical powers are coupled in the adjacent cores (defining the coupled core) with respect to the CMCF. The power coupling coefficient h in Expression (1) described above means a power coupling coefficient $h_{mn}$ from the core m to the core n, and is calculated from the refractive index of each of the cores, the core pitch, and the bending state of the CMCF. Specifically, the power coupling coefficient h ($=h_{mn}$) is defined by following Expression (2), in the same manner as Expression (8) of Non-patent Document 1 described above, and the whole description of Non-patent Document 1 is incorporated into the specification of the present application. The power coupling coefficient $h_{nm}$ disclosed in Expression (8) of Non-patent Document 1 is a power coupling coefficient from the core n to the core m, but is equivalent to the power coupling coefficient h of Expression (1) described above serving as the power coupling coefficient $h_{mn}$ from the core m to the core n.

$$h(=h_{mn}) = \Delta X_{mn}/\Delta z \quad (2)$$

where $\Delta z$ is a segment length of a fiber segment $[z_1, z_2]$ (fiber segment between a position of a distance $z_1$ along a fiber longitudinal direction from a reference point such as a light incident end surface and a position of a distance $z_2$ ($>z_1$) from the reference point), and is provided by "$z_2-z_1$". $\Delta X_{mn}$ is an average crosstalk increase from the core m to the core n in the fiber region with the segment length $\Delta z$, and provided by Expression (4) of Non-patent Document 1 described above.

The alkali metal addition concentration of the core portion 110 in the preform 100A before drawing is set such that the average concentration of alkali metal in each core 210 in the CMCF 200A after drawing is 0.2 atom ppm or more and 50 atom ppm or less. This is because crystallization of $SiO_2$ glass to which alkali metal of high concentration is added is accelerated, and relaxation of the glass structure of each core 210 can be promoted during drawing, when the average value of alkali metal included in each core 210 of the CMCF 200A after drawing is 0.2 atom ppm or more. By contrast, when the average concentration of alkali metal in each core 210 in the CMCF 200A after drawing becomes 50 atom ppm or more, the transmission loss at the wavelength of 1550 nm after irradiation of radial rays with cumulative absorption dose of 0.10 Gy or more increases by 0.02 dB/km or more in comparison with that before irradiation of radial rays, and a problem occurs in use in a system requiring long-time stability of transmission loss, such as a submarine system. For this reason, such average concentration is not preferable.

In addition, when the core portions 110 of the preform 100A has low halogen element concentration, such low halogen element concentration fails to sufficiently obtain the impurity removal effect with halogen elements in the preform manufacturing process, and causes increase in transmission loss due to absorption of impurities. By contrast, too many halogen elements are not desirable, because a halogen compound of alkali metal is generated and functions as a crystal generation core. By setting the concentration of halogen elements, such as Cl and F, to a range of 1000 atom ppm or more and 30000 atom ppm or less, the problem described above is not caused, and a CMCF of low transmission loss can be obtained.

In addition, the concentration of alkali metal in the glass surface (surface of the cladding 220) in the CMCF 200A after drawing is 1 atom ppm or less. When alkali metal is diffused to the glass surface of the CMCF 200A after drawing, the effect of cutting the $SiO_2$ glass network by the alkali metal causes large decrease in mechanical fatigue coefficient, and causes a problem in practical use. To avoid this problem, the concentration of alkali metal to the glass surface of the CMCF 200A after drawing is preferably 1 atom ppm or less, more preferably 0.1 atom ppm or less. When potassium is added as alkali metal to the core portions 110 of the preform 100A, potassium is diffused in a range with a radius of 15 to 50 μm after drawing. The diffusion radius depends on the potassium concentration at the stage of preform, and the temperature history during drawing. Accordingly, it is desirable to check the potassium reach distance after drawing in advance, and determine the potassium addition position to the core portions 110 or the cladding portions 120 in the cross section of the preform 100A.

Specifically, the average concentration of alkali metal elements (such as potassium) added to the core portions 110 of the preform 100A to reduce the transmission loss is 5 atom ppm or more, preferably 50 atom ppm or less. Because increase in loss due to irradiation of radial rays increases as the potassium concentration increases, the upper limit of the potassium average concentration in the core portions 110 at the stage of the preform is preferably set to 500 atom ppm. In addition, in the drawing process from the preform 100A to the CMCF 200A, the time for which each position of the preform 100A is maintained at 1500° C. or more in a drawing furnace is 110 minutes or less, and the drawing velocity (drawing velocity) is preferably 1200 m/min or more, more preferably 1500 to 2300 m/min or more. The diameter of the preform 100A is preferably 70 to 170 mmϕ, more preferably 90 to 150 mmϕ.

The transmission loss of the CMCF 200A after drawing at the wavelength of 1.55 μm decreases, as the time for which each position of the preform 100A is maintained at a temperature of 1500° C. or more decreases. This phenomenon is considered to be caused by the following reason. Specifically, when potassium with an average concentration of 500 atom ppm or less is included in the core portions 110 of the preform 100A, a hypothetical temperature of the CMCF 200A obtained from the preform 100A is 1400 to 1550° C., and diffusion of potassium advances in the time with the temperature from the peak temperature (more than 1500° C.) to 1500° C. in the drawing furnace. By contrast, when diffusion of potassium advances too much, potassium is broadly diffused outside beyond the optical power profile f the communication wavelength band (1550 nm band). In this case, because the effective potassium concentration decreases, structural relaxation of the glass network does not advance, and the transmission loss is not reduced. Accordingly, the optical transmission loss of the CMCF 200A after drawing is more reduced, as the time for which the preform is maintained at the glass temperature of 1500° C. or more, in which diffusion of potassium advances well, is shorter.

By drawing from the preform 100A to the CMCF 200A under such conditions, the alkali metal concentration of 0.2 atom ppm or more can be preferably achieved, in each of the cores 210 of the CMCF 200A after drawing. In a CMCF in which each core is substantially comprised of pure silica glass, to achieve the transmission loss to be lower than 0.170 dB/km, the time for which each position of the preform is maintained at a temperature of 1500° C. or more is required to be 110 minutes or less, more preferably 70 minutes or less.

In addition, the present embodiment enables, by a preferable combination, slow-cooling drawing promoting relaxation of the glass structure by maintaining the temperature of the CMCF during drawing at a certain temperature or more. When the present embodiment is combined with slow-cooling drawing, further lower transmission loss can be obtained. For a slow-cooling drawing method, the skilled person could obtain proper manufacturing conditions necessary for reducing transmission loss.

In addition, in the specification of the present application, "atom ppm" indicating the alkali concentration and the halogen concentration indicates number of dopant atoms in $SiO_2$ glass of million units. For example, in the case of potassium, the term "atom ppm" indicates a ratio of the number of atoms of K to the number of $SiO_2$ molecules, regardless of the coupling form in the $SiO_2$ glass. The same is applicable to the case of using Li, Na, or Rb, and the case of using Cl or F.

Various refractive index profiles as illustrated in FIGS. 3A to 3G are applicable to the region R1 (see FIG. 1A) including each core 210 and part of the cladding 220 around the core 210 in the CMCF 200A having the structure as described above.

A proper structure may be selected according to use, with respect to the refractive index profile of each core 210 and optical properties accompanying therewith. The cores 210 may have a uniform structure, or different structures. In addition, the number of cores in the cross section of the CMCF 200A is not limited, and the cross-sectional diameter (glass diameter) of the CMCF 200A and the external diameter of the covering resin provided on the external circumferential surface of the cladding 220 may be properly set according to the number of cores contained.

Specifically, as the shape of the refractive index profile of the region R1 including each core 210, any of a step type (FIG. 3A), a ring type (FIG. 3B), a double-step type (FIG. 3C), and a graded type (FIG. 3D) is applied to the region corresponding to the core 210. In addition, any of a depressed type (FIG. 3E), a matched type (FIG. 3F), and a trench type (FIG. 3G) is applicable to the region corresponding to the cladding 220. Each core 210 may have a structure premised on the single mode operation in which the number of modes to be transmitted through the core is one, or a structure premised on the multi-mode operation transmitting a plurality of modes.

Figure 4A:
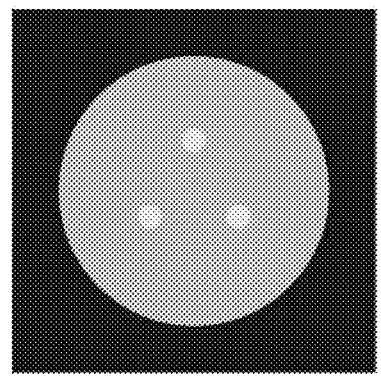
FIGS. 4A to 4D are cross-sectional views of the CMCF, illustrating various examples of applicable core arrangement.
Figure 4B:
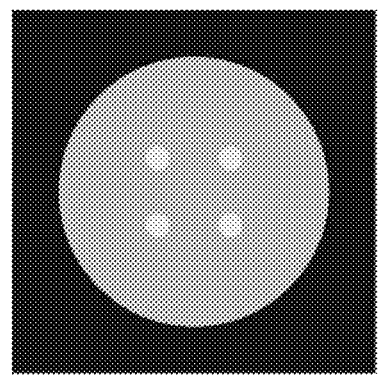
Figure 4C:
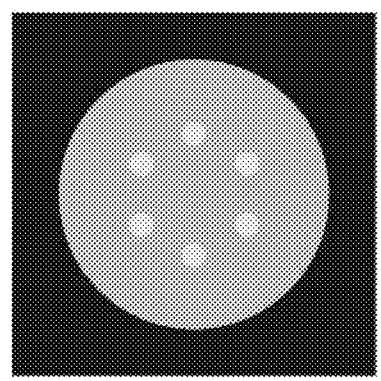
Figure 4D:
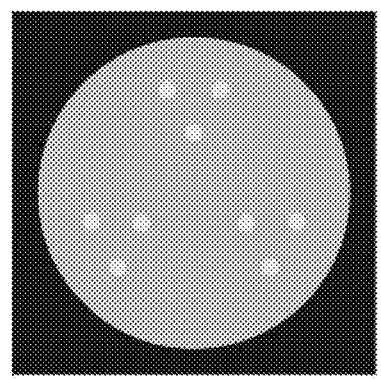

FIGS. 4A to 4D are cross-sectional views of CMCFs illustrating various examples of core arrangements applicable to the present embodiment. Specifically, as the core arrangement applicable to the present embodiment, structures in which cores 210 are arranged symmetrically with respect to the central axis AX of the CMCF 200A may be adopted, as illustrated in FIGS. 4A to 4C, As another example, a structure as illustrated in FIG. 4D may be adopted. In the structure of FIG. 4D, a plurality of core groups, each of which is constituted by a plurality of core elements, are arranged in a ring shape around the central axis AX of the CMCF 200A.

In the refractive index profile as described above, when a structure is adopted in which at least one of the cores 210 is comprised of $SiO_2$ glass with $GeO_2$ molecules having an additive amount of 1 wt % or less and fluorine is doped to the cladding 220, the transmission loss of the core 210 is preferably 0.16 db/km or less at the wavelength of 1550 mn. Generally, when each core is comprised of $SiO_2$ glass to which $GeO_2$ molecules to increase the refractive index of the core are not substantially doped, because dispersion caused by concentration fluctuations of $GeO_2$ molecules can be suppressed, the transmission loss can be suppressed to 0.16 dB/kin or less. The transmission loss is preferably 0.155 dB/km or less, more preferably 0.150 dB/km or less.

In addition, in the refractive index profile as described above, a structure may be adopted in which germanium is doped to at least one of the cores 210. In this case, the transmission loss of each of the cores is preferably 0.18 dB/km at the wavelength of 1550 nm. A core to which germanium is doped generally has higher transmission loss than that of an optical fiber including a pure silica core. However, dispersion is reduced by co-doping the core with germanium and alkali metal, and consequently transmission loss is reduced. However, when alkali metal is doped to a core portion to which germanium is doped at the stage of the preform, crystals are easily generated in the core after drawing, and manufacturability deteriorates. For this reason, in the preform manufacturing process, it is preferable that no alkali metal is directly doped to the core portion doped with germanium, but alkali metal is doped to only the cladding portion of the preform, and the alkali metal is diffused into the core in heating in drawing.

Figure 6A:
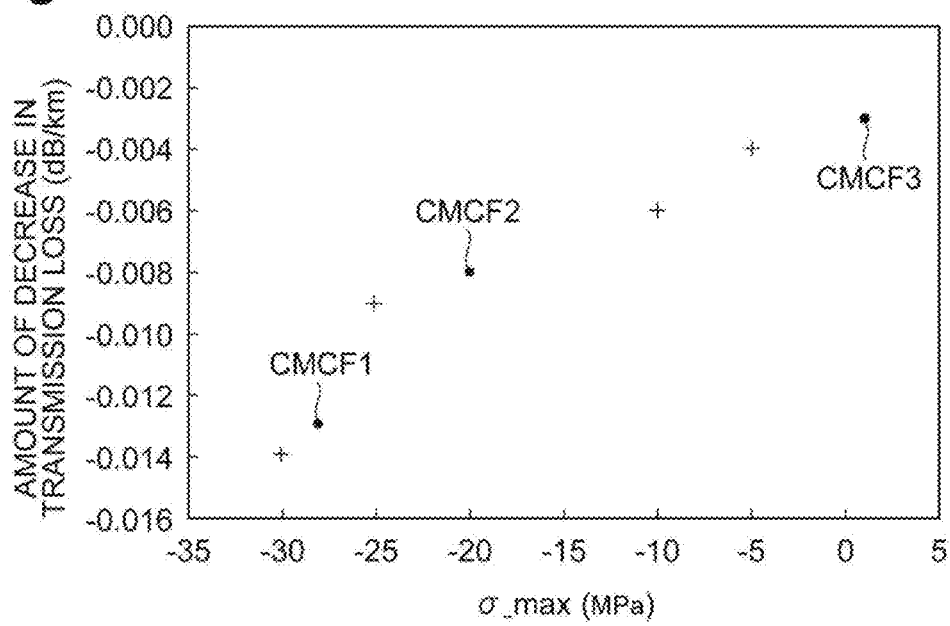
FIGS. 6A and 6B are graphs illustrating relation between the maximum value $\sigma\_max$ (MPa) of the stress profile between adjacent cores and amount of decrease in transmission loss (dB/km), and relation between the core pitch (distance between centers of adjacent cores) $\Lambda_{core}$ (μm) and amount of decrease in transmission loss (dB/km), respectively, for each of the three samples 1 to 3 (MCF1 to MCF3) of the CMCF according to the first embodiment.
Figure 6B:
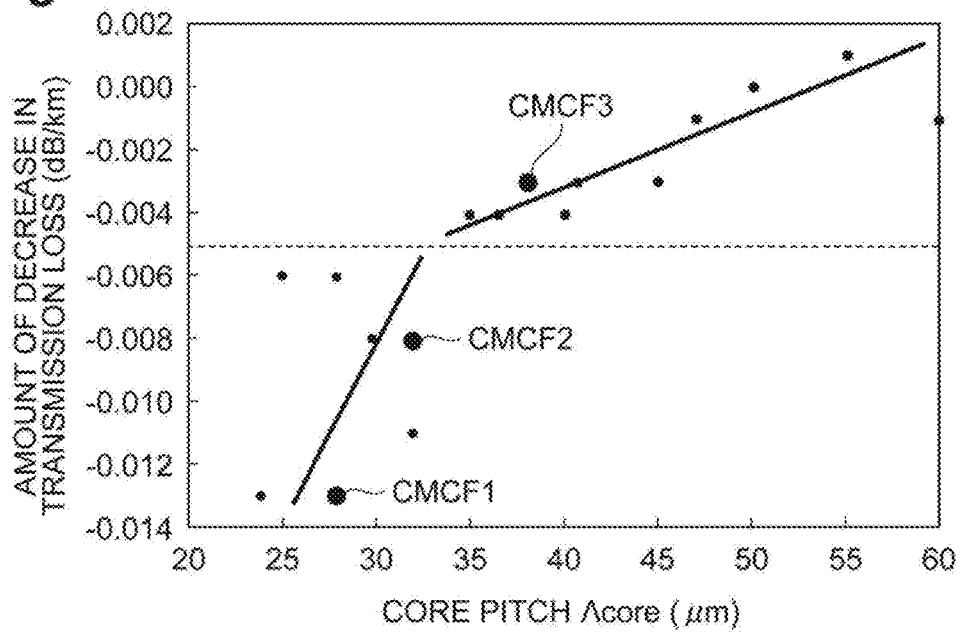

The following is detailed explanation of optical properties and the like of samples of the CMCF 200A according to the present embodiment and a comparative example, with reference to FIGS. 5, 6A, and 6B.

Figure 3A:
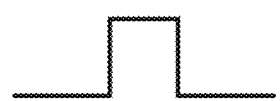
FIGS. 3A to 3G are diagrams illustrating various refractive index profiles applicable to a region R1 including a core and part of cladding around the core.
Figure 3B:
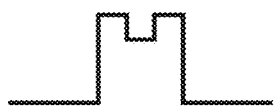
Figure 3C:
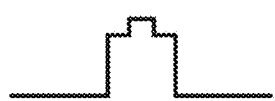
Figure 3D:
Figure 3E:
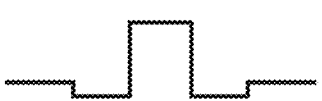
Figure 3F:
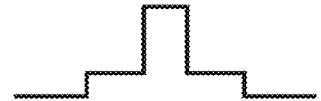
Figure 3G:
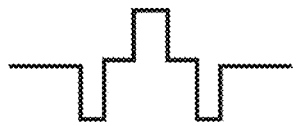

As prepared samples of the CMCF 200A according to the present embodiment, each of CMCF1 to CMCF3 has a cross-sectional structure including three cores as illustrated in FIG. 1A, and the periphery of each core has the refractive index profile (step type) as illustrated in FIG. 3A. The core arrangement adopted in each of CMCF1 to CMCF3 has a structure in which three cores 210 are arranged around the central axis AX, as illustrated in FIG. 1A. By contrast, the comparative example is an SCF including a core, and has the refractive index profile as illustrated in FIG. 3A.

Each of CMCF1 serving as Sample 1, CMCF2 serving as Sample 2, CMCF3 serving as Sample 3, and the SCF of the comparative example is based on pure silica, and has a 0.32% relative refractive index difference Δ of the core center based on the cladding, and has a core diameter 2a of 11.1 μm. In addition, CMCF1 has the core pitch $\Lambda_{core}$ of 28 μm, and the power coupling coefficient h of $1.1 \times 10^{-2}$/m. CMCF2 has the core pitch $\Lambda_{core}$ of 32 μm, and the power coupling coefficient h of $1.0 \times 10^{-3}$/m. CMCF3 has the core pitch $\Lambda_{core}$ of 38 μm and the power coupling coefficient h of $8.5 \times 10^{-6}$/m. Each of CMCF1, CMCF2, CMCF3, and the SCF of the comparative example has a fiber external diameter of 125 μm, and has drawing conditions in which the drawing velocity is 1300 m/min, and the drawing tension is 80 to 100 g. Potassium is doped as alkali metal dopant to each core portion of the respective preforms of CMCF1, CMCF2, CMCF3, and the SCF.

FIG. 5 is a table illustrating optical properties of CMCF1, CMCF2, CMCF3, and the SCF together.

Specifically, the average effective area $A_{eff}$ of the SCF prepared as described above was 110 μm² at the wavelength of 1550 nm. In addition, the average effective area $A_{eff}$ of each core of the CMCF1 ($\Lambda_{core}$=28 μm) was 107 μm² at the wavelength of 1550 nm, and the stress maximum value $\sigma_{\_max}$ between cores of CMCF1 was −28 MPa (compressive stress). The average effective area $A_{eff}$ of each core of the CMCF2 ($\Lambda_{core}$=32 μm) was 109 μm² at the wavelength of 1550 nm, and the stress maximum value $\sigma_{\_max}$ between cores of CMCF2 was −20 MPa (compressive stress). The average effective area $A_{eff}$ of each core of the CMCF3 ($\Lambda_{core}$=38 μm) was 105 μm² at the wavelength of 1550 nm, and the stress maximum value $\sigma_{\_max}$ between cores of CMCF3 was MPa (tensile stress).

The transmission loss of the SCF of the comparative example was 0.161 dB at the wavelength of 1550 nm. Under the same drawing conditions, transmission loss of the CMCF1 was 0.148 dB at the wavelength of 1550 nm, transmission loss of the CMCF2 was 0.153 dB at the wavelength of 1550 nm, and transmission loss of the CMCF3 was 0.158 dB at the wavelength of 1550 nm. In comparison with the transmission loss of the SCF, an amount of decrease in transmission loss of CMCF1 was −0.013 dB/km, an amount of decrease in transmission loss of CMCF2 was −0.008 dB/km, and an amount of decrease in transmission loss of CMCF3 was −0.003 dB/km.

FIG. 6A is a graph illustrating relation between the maximum value $\sigma_{\_max}$ (MPa) of the stress profile between adjacent cores and the amount of decrease (dB/km) in transmission loss of each of various CMCF samples including Samples 1 to 3 (CMCF1 to CMCF3) prepared as described above, As can be seen from FIG. 6A, a marked decrease in transmission loss can be found in samples (including CMCF1 and CMCF2) in which the stress maximum value $\sigma_{\_max}$ has a negative value, that is, compressive stress is maintained. More preferably, the stress maximum value $\sigma_{\_max}$ is set to −20 MPa or less, to further reduce the transmission loss. Further preferably, the stress maximum value $\sigma_{\_max}$ is set to −30 MPa or less.

FIG. 6B is a graph illustrating relation between the core pitch $\Lambda_{core}$ (μm) and the amount of decrease in transmission loss (dB/km) of each of various CMCF samples including Samples 1 to 3 (CMCF1 to CMCF3) prepared as described above.

As can be seen from FIG. 6B, in a sample with a core pitch $\Lambda_{core}$ exceeding 35 μm like CMCF3, the amount of decrease in transmission loss is less than 0.005 dB/km. By contrast, in a sample with a core pitch $\Lambda_{core}$ equal to or less than 35 μm like CMCF1 and CMCF2, the amount of decrease in transmission loss is 0.005 dB/km or more. The core pitch $\Lambda_{core}$ is preferably 30 μm or less, more preferably 25 μm or less.

Second Embodiment

Figure 7A:
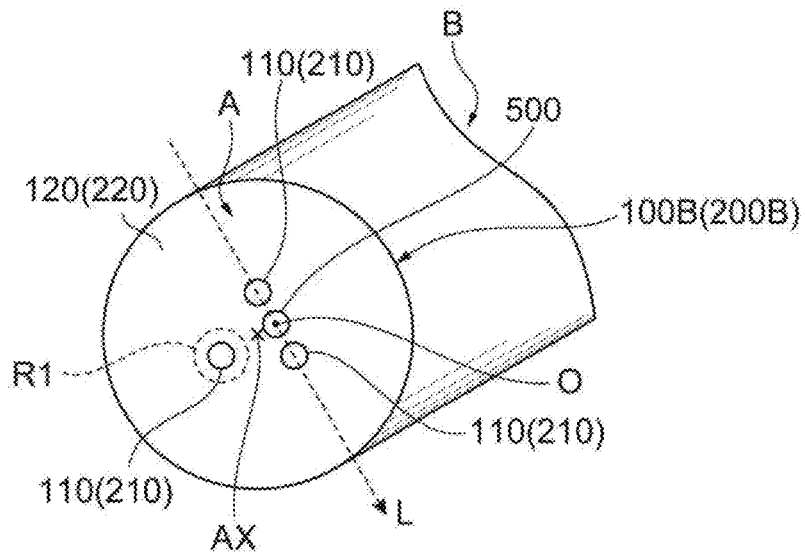
FIGS. 7A to 7C are diagrams illustrating cross-sectional structures, refractive index profiles, and alkali metal concentration profiles of a CMCF and a preform according to a second embodiment, respectively.
Figure 7B:
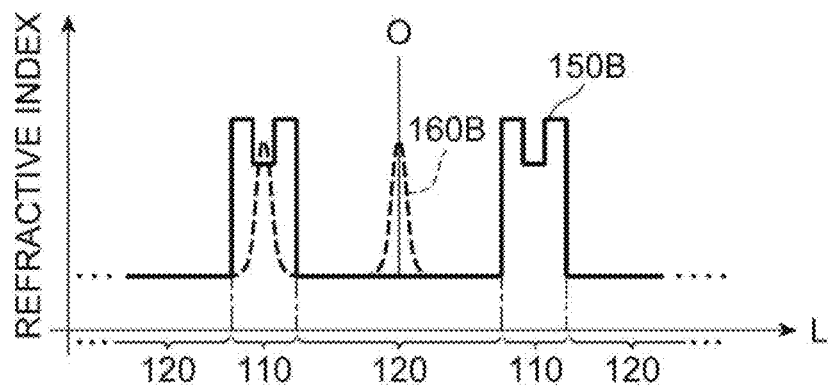
Figure 7C:
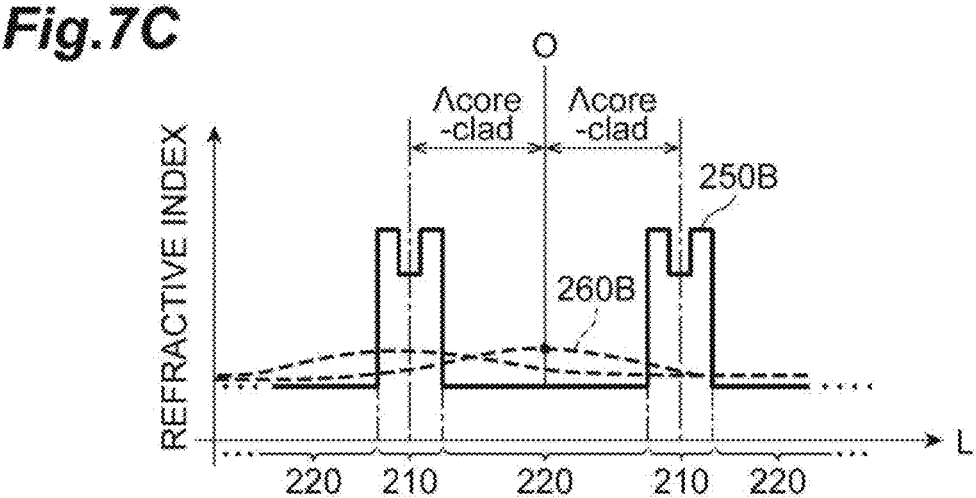

FIGS. 7A to 7C are diagrams illustrating cross-sectional structures, refractive index profiles, and alkali metal concentration profiles of a CMCF 200B and a preform 100B according to a second embodiment, respectively. The second embodiment illustrated in FIGS. 7A to 7C has the same structure as the structure FIG. 1A) of the first embodiment, except that an alkali-metal-doped region 500 is provided also in a cladding portion 120 held between core portions 110, as well as two core portions 110, in the preform 100B for manufacturing the CMCF 200B. In the example of FIG. 7A, a middle position between the cores 110 adjacent on line L is set to a diffusion center position O in which the concentration of alkali metal has a local maximum value.

Specifically, in FIG. 7A, the preform 100B includes core portions 110 each extending along the central axis AX from one end A to the other end B, and a cladding portion 120 covering each of the core portions 110. As an example, three core portions 110 are arranged to surround the central axis AX, on the cross section of FIG. 7A. The CMCF 200B according to the present embodiment is obtained by drawing the preform 100B, and has a cross-sectional structure similar to the cross-sectional structure of the preform 100B. Cores 210 of the CMCF 200B correspond to the core portions 110 of the preform 100B, and a cladding 220 of the CMCF 200B corresponds to the cladding portion 120 of the preform 100B. FIG. 7B is a diagram illustrating a refractive index profile 150B and an alkali metal concentration profile 160B of the preform 100B along line L in FIG. 7A. As can be seen from FIG. 7B, in the present embodiment, an alkali-metal-doped region 500 doped with alkali metal is provided also in the cladding portion 120 of the preform 100B. FIG. 7B does not illustrate alkali metal concentration profile in one of the core portions 110, but an alkali-metal-doped region may be provided in all the core portions 110 also in the present embodiment, as a matter of course. FIG. 7C illustrates a refractive index profile 250B and an alkali metal concentration profile 260B of the CMCF 200B obtained by drawing the preform 100B according to the present embodiment, and illustrates profiles along line L in FIG. 7A, in the same manner as FIG. 7B. The term "$\Lambda_{core\text{-}clad}$" illustrated in FIG. 7C indicates a distance between the diffusion center position O in which the concentration of the alkali metal in the CMCF 200B after drawing has a local maximum value and the central position of each core 210.

The present embodiment enables more efficient reduction in transmission loss, by adding alkali metal also to the cladding portion 120, as well as the core portions 110 of the preform 100B. However, when a distance between the alkali-metal-doped region and the core portion 110 is large, alkali metal is not diffused to the core during drawing, and no transmission loss reduction effect can be obtained. Accordingly, in the case of using substance with an atomic number less than potassium (K), as the alkali metal, the distance $\Lambda_{core\text{-}clad}$ between the center of the core 210 and the diffusion center position O corresponding to the center of the alkali-metal-doped region 500 is required to be 45 µm or less, in the CMCF 200B after drawing. More preferably, the distance $\Lambda_{core\text{-}clad}$ is 30 µm or less, more preferably 25 µm or less.

In addition, when alkali metal is doped to the core portions 110 of the preform 100B, crystals easily occur in the cores during drawing, and increase in transmission loss may occur due to mixing of impurities other than alkali metal into the core portions 110, in the step of adding alkali metal into the core portions 110. For this reason, alkali metal is not directly doped to the core portions 110 at the stage of preform, but alkali metal (alkali-metal-doped region 500) doped to the cladding portion 120 in the drawing process is diffused into the core during drawing. This structure enables low transmission loss, without crystallization, fear of excessive loss due to mixing of impurities, or reduction in production yield.

In the preform 100B, with respect to arrangement of the alkali-meal-doped regions in the core portions 110 and the cladding portion 120, alkali-metal-doped regions exist in both core portions 110 and a middle region therebetween and extend along the preform longitudinal direction (central axis AX). This structure enables reduction in transmission loss of the obtained CMCF, even when the core pitch $\Lambda_{core}$ is set larger than that of the first embodiment in which each of adjacent core portions 110 is set as alkali-metal-doped region. However, when alkali metal is provided in a region close to the external circumference of the cladding, such arrangement is not desirable because it causes increase in concentration of alkali metal at the external circumference of the fiber due to diffusion during drawing, and reduces mechanical strength of the obtained CMCF 200B. Accordingly, the concentration of alkali metal in the surface of the cladding 220 of the CMCF 200B is preferably 1 atom ppm or less.

As described above, the present embodiment enables a coupled MCF (CMCF) achieving more efficient reduction in transmission loss, by suppressing decrease in concentration of alkali metal.

What is claimed is:

1. A coupled multi-core optical fiber comprising:
   a plurality of cores extending from one end to the other end; and
   a single cladding covering each of the cores, wherein
   each of the plurality of cores includes alkali metal contributing to reduction in transmission loss, and
   stress on a line segment connecting centers of the adjacent cores is compressive stress.

2. The coupled multi-core optical fiber according to claim 1, wherein
   a maximum value $\sigma_{\_max}$ of the stress on the line segment is −20 MPa or less.

3. The coupled multi-core optical fiber according to claim 1, wherein
   a distance $\Lambda_{core}$ between the adjacent cores is 35 µm or less.

4. A coupled multi-core optical fiber comprising:
   a plurality of cores extending from one end to the other end; and
   a single cladding covering each of the cores, wherein
   each of the plurality of cores includes alkali metal contributing to reduction in transmission loss,
   stress on a line segment connecting centers of the adjacent cores is compressive stress, and
   the cladding includes a diffusion center position in which concentration of the alkali metal has a local maximum value, and a distance $\Lambda_{core\text{-}clad}$ between the diffusion center position and a center position of a core adjacent to the diffusion center position among the plurality of cores is 45 µm or less.

5. The coupled multi-core optical fiber according to claim 1, wherein
   each of the plurality of cores is comprised of $SiO_2$ glass in which a concentration of $GeO_2$ molecules is set to be 0 wt % or more to 1 wt % or less,
   fluorine is doped to the cladding, and
   transmission loss of each of the plurality of cores at a wavelength of 1550 nm is 0.16 dB/km or less.

6. The coupled multi-core optical fiber according to claim 1, wherein
   germanium is doped to at least one of the plurality of cores, and
   transmission loss of the core with added germanium is 0.18 dB/km or less at the wavelength of 1550 nm.

7. The coupled multi-core optical fiber according to claim 1, wherein
   average concentration of the alkali metal in each of the plurality of cores is 0.2 atom ppm or more and 50 atom ppm or less.

8. The coupled multi-core optical fiber according to claim 1, wherein average concentration of halogen elements in each of regions corresponding to the plurality of cores in a preform of the coupled multi-core optical fiber before drawing is 1000 atom ppm or more and 30000 atom ppm or less.

9. The coupled multi-core optical fiber according to claim 1, wherein
concentration of the alkali metal in a surface of the cladding is 1 atom ppm or less.

10. The coupled multi-core optical fiber according to claims 4, wherein
a maximum value $\sigma\_{max}$ of the stress on the line segment is −20 MPa or less.

11. The coupled multi-core optical fiber according to claims 4, wherein
a distance $\Lambda_{core}$ between the adjacent is 35 μm or less.

12. The coupled multi-core optical fiber according to claims 4, wherein
each of the plurality of cores is comprised of $SIO_2$ glass in which a concentration of $Geo_2$ molecules is set to be 0 wt % or more to 1 wt % or less,
fluorine is doped to the cladding, and
transmission loss of each of the plurality of cores at a wavelength of 1550 nm in 0.16 dB/km or less.

13. The coupled multi-core optical fiber according to claims 4, wherein
germanium is doped to at least one of the plurality of cores, and transmission loss of the core with added germanium is 0.18 dB/km or less at the wavelength of 1550 nm.

14. The coupled multi-core optical fiber according to claims 4, wherein
average concentration of the alkali metal in each of the plurality of cores is 0.2 atom ppm or more and 50 atom ppm or less.

15. The coupled multi-core optical fiber according to claims 4, wherein
average concentration of halogen elements in each of regions corresponding to the plurality of cores in a preform of the coupled multi-core optical fiber before drawing is 1000 atom ppm or more and 30000 atom ppm of less.

16. The coupled multi-core optical fiber according to claims 4, wherein
concentration of the alkali metal in a surface of the cladding is 1 atom ppm or less.

* * * * *